US012592384B2

(12) United States Patent
Wu et al.

(10) Patent No.: US 12,592,384 B2
(45) Date of Patent: Mar. 31, 2026

(54) POSITIVE ELECTRODE ACTIVE MATERIAL AND PREPARATION METHOD THEREFOR, POSITIVE ELECTRODE, AND LITHIUM ION SECONDARY BATTERY

(71) Applicant: HS BATTERY TECHNOLOGY, Dongguan (CN)

(72) Inventors: Yida Wu, Dongguan (CN); Xuejie Huang, Dongguan (CN); Yuanjie Zhan, Dongguan (CN); Xiaowei Ma, Dongguan (CN)

(73) Assignee: HS BATTERY TECHNOLOGY (CN)

( * ) Notice: Subject to any disclaimer, the term of this patent is extended or adjusted under 35 U.S.C. 154(b) by 540 days.

(21) Appl. No.: 18/318,375

(22) Filed: May 16, 2023

(65) Prior Publication Data

US 2023/0317942 A1     Oct. 5, 2023

Related U.S. Application Data

(63) Continuation of application No. PCT/CN2021/120159, filed on Sep. 24, 2021.

(30) Foreign Application Priority Data

Nov. 17, 2020   (CN) .......................... 202011284601.1

(51) Int. Cl.
| | |
|---|---|
| *H01M 4/525* | (2010.01) |
| *H01M 4/04* | (2006.01) |
| *H01M 4/36* | (2006.01) |
| *H01M 4/505* | (2010.01) |
| *H01M 10/0525* | (2010.01) |
| *H01M 4/02* | (2006.01) |

(52) U.S. Cl.
CPC ......... *H01M 4/525* (2013.01); *H01M 4/0404* (2013.01); *H01M 4/0471* (2013.01); *H01M 4/366* (2013.01); *H01M 4/505* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2015/0099178 A1     4/2015   Kawakami et al.

FOREIGN PATENT DOCUMENTS

| | | |
|---|---|---|
| CN | 1399364 A | 2/2003 |
| CN | 101223660 A | 7/2008 |
| CN | 101510606 A | 8/2009 |
| CN | 104577128 A | 4/2015 |
| CN | 105304891 A | 2/2016 |
| CN | 106058203 A | 10/2016 |
| CN | 105304891 B | 5/2018 |
| CN | 108565416 A | 9/2018 |
| CN | 109065868 A | 12/2018 |
| CN | 110797511 A | 2/2020 |
| CN | 110911687 A | 3/2020 |
| CN | 110931738 A | 3/2020 |
| CN | 111193018 A | 5/2020 |
| CN | 112151773 A | 12/2020 |
| CN | 112151773 B | 5/2022 |
| JP | 2015099662 A | 5/2015 |

OTHER PUBLICATIONS

China National Intellectual Property Adminstration; Notice of Registration and Notice of Granting of Patent Right dated Sep. 12, 2023 issued in CN App. No. 202011284601.1; 8 pages.
International Search Report and Written Opinion of PCT/CN2021/120159, dated Dec. 8, 2021.
The first Office Action issued by the China National Intellectual Property Administration (CNIPA) on May 6, 2023 for the Chinese Patent Application No. 202011284601.1.
Ben, L. et al., Ta2O5 Coating as an HF Barrier for Improving the Electrochemical Cycling Performance of High-Voltage Spinel LiNi0.5Mn1.5O4 at Elevated Temperatures, ACS Applied Energy Materials, vol. 1, No. 10, 5589-5598, Sep. 2018.

*Primary Examiner* — Carlos Barcena
(74) *Attorney, Agent, or Firm* — MASCHOFF BRENNAN

(57)          ABSTRACT

The present application discloses a positive electrode active material, comprising a lithium nickel manganese oxide modified material and a coating layer on the surface of the lithium nickel manganese oxide modified material. The lithium nickel manganese oxide modified material is a primary particle with a core-shell-like structure comprising a spinel phase and a rocksalt-like structure phase. The spinel phase is an inner core, and the rocksalt-like structure phase constitutes an outer shell. The rocksalt-like structure phase is further doped with a phosphorus element and the phosphorus element is distributed in a gradient from the outer surface to the interior of the rocksalt-like structure phase. The present application further discloses a preparation method of the positive electrode active material, a positive electrode containing the positive electrode active material for lithium-ion secondary batteries, and a lithium ion secondary battery.

19 Claims, 5 Drawing Sheets

POSITIVE ELECTRODE ACTIVE MATERIAL AND PREPARATION METHOD THEREFOR, POSITIVE ELECTRODE, AND LITHIUM ION SECONDARY BATTERY

CROSS-REFERENCE TO RELATED APPLICATIONS

The present application is a continuation of International Application No. PCT/CN2021/120159, filed on Sep. 24, 2021, which claims priority to Chinese Patent Application No. 202011284601.1, filed on Nov. 17, 2020, both of which are incorporated herein by reference in their entireties.

TECHNICAL FIELD

The present application relates to the technical field of positive electrode materials, in particular to a positive electrode active material and a preparation method therefor, a positive electrode, and a lithium ion secondary battery.

BACKGROUND

Compared with other rechargeable battery systems, lithium-ion secondary batteries have the advantages of high operating voltage, light weight, small size, no memory effect, low self-discharge rate, long cycle life, and high energy density and are used widely for mobile terminal products such as mobile phones, notebook computers, and tablet computers. In practical applications, for high-voltage spinel positive electrode materials, they would lose oxygen on their surface, and thus their surface will be dissolved during a cycle process, due to the interaction between a traditional carbonates electrolytic solution and the positive electrode, which eventually leads to decrease in active substances. Thus, surface modification has become the focus of attention. The surface modification method commonly used in the field is to coat the surface of positive electrode materials, through which the surface structure of materials can be well fixed, so that the positive electrode materials are stable, and the corrosion of electrolytic solution can be suppressed. The surface coating can block the direct contact between positive electrode materials and electrolytic solution, reduce the decomposition of electrode materials under high voltage, and is beneficial to improving the stability of the entire high-voltage interface.

However, during the coating process, due to the difference between coating materials and the surface structure of materials to be coated, it is difficult for the coating materials to uniformly and stably coat the surface of positive electrode materials. At the same time, even if the surface of positive electrode materials can be coated with coating materials, the positive electrode material will eventually be exposed to an electrolytic solution under high voltage since the coating on the surface is gradually worn, which will still cause rapid performance degradation.

SUMMARY

On the basis, it is necessary to provide a positive electrode active material and a preparation method therefor, a positive electrode, and a lithium ion secondary battery in order to solve the problem that a coating layer on the surface of positive electrode materials is easy to be worn.

A positive electrode active material is provided, comprising a lithium nickel manganese oxide modified material and a coating layer on the surface of the lithium nickel manganese oxide modified material. The coating layer is composed of an inorganic compound. The inorganic compound is any one or more selected from oxides, fluorides, phosphides, and borides. The lithium nickel manganese oxide modified material is a primary particle with a core-shell structure comprising a spinel phase and a rocksalt-like structure phase. The spinel phase is an inner core, and the rocksalt-like structure phase is distributed on the surface of the spinel phase to form an outer shell. The spinel phase is a spinel-structured lithium nickel manganese oxide. The rocksalt-like structure phase is formed by inducing the spinel-structured lithium nickel manganese oxide. The rocksalt-like structure phase contains at least one of Mg, Zn, Ni, Mn, Fe, Co, Ti, Cr, Y, Sc, Ru, Cu, Mo, Ge, W, Zr, Ca, Ta, Sr, Al, Nb, B, Si, F and S as a site occupying element. The site occupying element occupies the 16c or 8a position of the spinel structure. The rocksalt-like structure phase is further doped with a phosphorus element. The phosphorus element is distributed in a gradient concentration from the outer surface to the interior of the rocksalt-like structure phase, forming a phosphorus gradient doping layer.

In some embodiments, the inorganic compound comprises any one or more of oxides, fluorides, phosphides and borides of any one element selected from Li, Mg, Zn, Ni, Mn, Fe, Co, Ti, Y, Sc, Ru, Cu, Mo, Ge, W, Zr, Ca, Ta, Al, Nb, B, Si, F, S, P and Sr.

In some embodiments, the spinel-structured lithium nickel manganese oxide has the chemical formula of $Li_{1+x}Ni_{0.5-y}Mn_{1.5-z}O_u$, wherein $0.2 \le x \le 0.2$, $-0.2 \le y \le 0.2$, $-0.2 \le z \le 0.2$, $3.8 \le u \le 4.2$.

In some embodiments, the spinel-structured lithium nickel manganese oxide has the chemical formula of $Li_{1+x}Ni_{0.5-y}Mn_{1.5-z}M_sO_u$, wherein M is at least one of Mg, Zn, Ni, Mn, Fe, Co, Ti, Cr, Y, Sc, Ru, Cu, Mo, Ge, W, Zr, Ca, Ta, Sr, Al, Nb, B, Si, F and S, $-0.2 \le x \le 0.2$, $-0.2 \le y \le 0.2$, $-0.2 \le z \le 0.2$, $0 < s \le 0.2$ and $3.8 \le u \le 4.2$. In one embodiment, the coating layer has a thickness of from 2 nm to 20 nm.

In some embodiments, the spinel phase has a size of 0.1 μm to 30 μm.

In some embodiments, the rocksalt-like structure phase has a thickness of 0.5 nm to 50 nm.

In some embodiments, the primary particle has a phosphorus element concentration that gradually decreases from the outer surface to the interior.

In some embodiments, the phosphorus gradient doping layer has a thickness of from 0.5 nm to 40 nm.

A method for preparing a positive electrode active material is provided, comprising the steps of:

providing a lithium nickel manganese oxide modified material;

mixing an inorganic compound or an inorganic compound precursor with the lithium nickel manganese modified material to obtain a coating mixture, in which the inorganic compound precursor will form the inorganic compound when sintered; and sintering the coating mixture in air, oxygen or inert gas at a temperature of from 150° C. to 550° C. for 0.5 hour to 20 hours.

In some embodiments, the step of providing the lithium nickel manganese modified material comprises:

mixing a phosphorus source, a rocksalt-like structure phase inducer, and a spinel-structured lithium nickel manganese oxide to obtain a doping mixture; and sintering the doping mixture at a temperature of from 600° C. to 1200° C. for 0.5 hours to 20 hours.

In some embodiments, the inorganic compound precursor is any one or more selected from oxides, organic compounds, fluorides, phosphides, and borides.

In some embodiments, the doping mixture is sintered by a procedure comprising heating it to 600° C.-1200° C. at a heating rate of 0.5° C./min-10° C./min, then sintering it for 0.5-20 hours, and then lowering it at a cooling rate of 0.5° C./min-10° C./min to room temperature.

A positive electrode for a lithium ion secondary battery is provided, comprising a positive electrode current collector and a positive electrode active material film on the positive electrode current collector, the positive electrode active material film comprising the positive electrode active material as described above.

A lithium-ion secondary battery is provided, comprising: the positive electrode as described above; a negative electrode comprising a negative electrode current collector and a negative electrode active material film on the negative electrode current collector; a separator and an electrolytic solution.

In the present application, a lithium nickel manganese oxide modified material is obtained by first inducing the surface of a spinel-structured lithium nickel manganese oxide and gradually doping it with a phosphorus element, on which an inorganic compound is coated, thereby obtaining the positive electrode active material. The lithium nickel manganese oxide modified material has a rocksalt-like structure phase on its surface, and the rocksalt-like structure phase surface is conducive to the gradient doping of phosphorus elements on the surface of the lithium nickel manganese oxide modified material. The surface doping of phosphorus element can significantly improve electrochemical performances of the positive electrode active material, including the first discharge efficiency, the average discharge efficiency and the charge-discharge cycle stability. The inorganic compound coating layer can increase interface stability, but will lead to a decrease in surface electronic conductivity of the positive active material since the inorganic compound is non-conductive. The surface gradient doping of phosphorus element can not only increase the surface structure stability of lithium nickel manganese oxide itself, but also improve the surface electronic conductivity of the positive electrode active material. At the same time, the gradient doping of phosphorus element can make a change in surface energy of the positive electrode active material, during which a large amount of rocksalt-like structure phase structure is introduced on the surface of lithium nickel manganese oxide. Such a structure matches better with lattice constants of inorganic compounds, especially oxides, which is conducive to the close combination of the inorganic compounds with the surface of the lithium nickel manganese oxide modified material, making the coating layer more uniform and firmer, and thus the modification effect is better.

DESCRIPTION OF EMBODIMENTS

Figure 1:
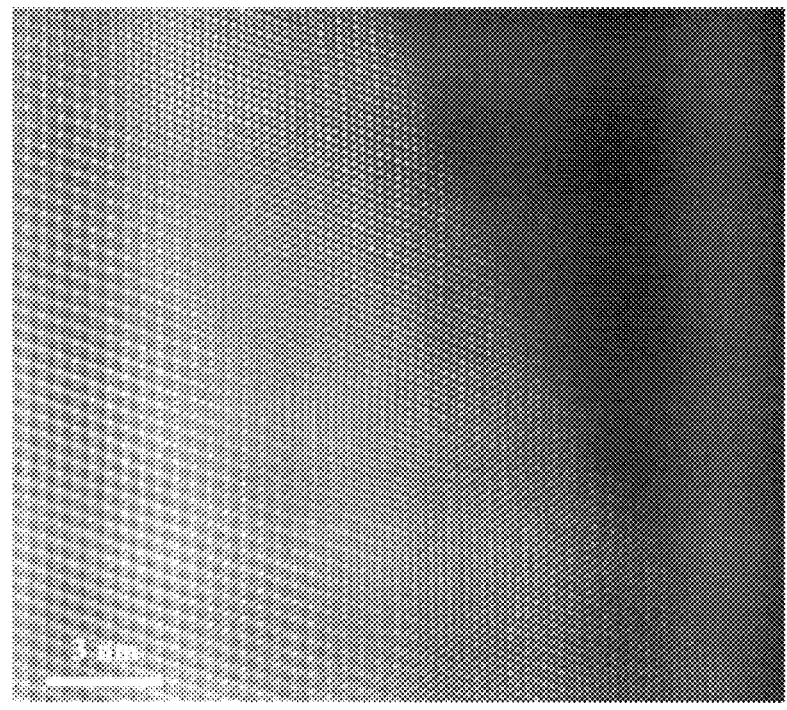
FIG. 1 is a scanning transmission electron microscope (STEM) image of the phosphorus-doped lithium nickel manganese oxide modified material prepared in Example 1 of the present application.

In order to facilitate understanding of the present application, the present application will be described more fully below with reference to the related drawings. The preferred embodiments of the present application are shown in the accompanying drawings. However, the application may be implemented in many different forms and is not limited to the embodiments described herein. Rather, these embodiments are provided so that the disclosure of this application are understood thoroughly and completely.

Unless otherwise defined, all technical and scientific terms used herein have the same meaning as those terms commonly understood by one of ordinary skill in the technical field to which this application belongs. The terms used herein in the specification of the application are for the purpose of describing specific embodiments only, and are not intended to limit the application. As used herein, the term "and/or" includes any and all combinations of one or more of the associated listed items.

Except as shown in the working examples or otherwise indicated, all numbers used in the specification and claims indicating amounts of ingredients, physicochemical properties, etc. are understood to be adjusted in all cases by the term "about". For example, unless otherwise indicated, the numerical parameters set forth in the foregoing specification and attached claims are approximations that those skilled in the art can seek to obtain the desired properties and adjust these approximations as appropriate using the teachings disclosed herein. The numerical ranges by endpoints includes all numbers within that range and any range within that range, e.g., 1 to 5 includes 1, 1.1, 1.3, 1.5, 2, 2.75, 3, 3.80, 4, and 5 and the like.

According to embodiments of the present application, a positive electrode active material is provided, comprising a lithium nickel manganese oxide modified material and a coating layer on the surface of the lithium nickel manganese oxide modified material. The coating layer is composed of an inorganic compound. The lithium nickel manganese oxide modified material is a primary particle with a core-shell structure comprising a spinel phase and a rocksalt-like structure phase. The spinel phase is an inner core, and the rocksalt-like structure phase is distributed on the surface of the spinel phase to form an outer shell.

The spinel phase is a spinel-structured lithium nickel manganese oxide. The rocksalt-like structure phase is formed by inducing the spinel-structured lithium nickel manganese oxide. The rocksalt-like structure phase contains nickel, manganese, lithium and oxygen elements and further comprises a site occupying element. The site occupying element is at least one selected from Mg, Zn, Ni, Mn, Fe, Co, Ti, Cr, Y, Sc, Ru, Cu, Mo, Ge, W, Zr, Ca, Ta, Sr, Al, Nb, B, Si, F and S and the site occupying element occupies the 16c or 8a position of the spinel structure.

The rocksalt-like structure phase is further doped with a phosphorus element and the phosphorus element is distributed in a gradient from the outer surface to the interior of the rocksalt-like structure phase.

In the present application, a lithium nickel manganese oxide modified material is obtained by first inducing the surface of a spinel-structured lithium nickel manganese oxide and gradually doping it with a phosphorus element, on which an inorganic compound is coated, thereby obtaining the positive electrode active material. The lithium nickel manganese oxide modified material has a rocksalt-like structure phase on its surface, and the rocksalt-like structure phase surface is conducive to the gradient doping of phosphorus elements on the surface of the lithium nickel manganese oxide modified material. The surface doping of phosphorus element can significantly improve electrochemical performances of the positive electrode active material, including the first discharge efficiency, the average discharge efficiency and the charge-discharge cycle stability. The inorganic compound coating layer can increase interface stability, but will lead to a decrease in surface electronic conductivity of the positive active material since the inorganic compound is non-conductive. The surface gradient doping of phosphorus element can not only increase the surface structure stability of lithium nickel manganese oxide, but also improve the surface electronic conductivity of the positive electrode active material. At the same time, the gradient doping of phosphorus element can make a change in the surface energy of the positive electrode active material, during which a rocksalt-like structure phase structure is introduced on the surface of lithium nickel manganese oxide. Such a structure matches better with lattice constants of inorganic compounds, especially oxides, which is conducive to the close combination of the inorganic compounds with the surface of the lithium nickel manganese oxide modified material, making the coating layer more uniform and firmer, and thus the modification effect is better.

The generally defined core-shell structure is an ordered assembly formed by one material wrapping another material through chemical bonds or other forces. In the present application, the primary particle is a core-shell-like structure, and the core-shell-like structure is defined as such a structure that "core" and "shell" are actually integrated. The "shell" is a rocksalt structure phase formed by surface lattice reconstruction of a spinel structure. The lithium nickel manganese oxide modified material of the present application includes two phases in its structure, resulting in the crystal structure of the surface layer being different from the crystal structure of the interior. In the present application, the interior of the material thus formed is referred to as a "core", and the surface layer is referred to as a "shell", and a material with such a structure is defined as a material of a core-shell-like structure.

The primary particle refers to the smallest unit constituting the lithium nickel manganese oxide modified material, and specifically refers to the smallest unit that can be determined based on geometric configuration of profile. Aggregates of primary particles are secondary particles. The primary particles have a core-shell-like structure. In the core-shell-like structure, the inner core of the spinel phase and the outer shell of the rocksalt-like structure phase are integrated, and the spinel phase and the rocksalt-like structure phase are bound together through oxygen bonding and cannot be separated from each other.

In some embodiments, the spinel-structured lithium nickel manganese oxide has the chemical formula of $Li_{1+x}Ni_{0.5-y}Mn_{1.5-z}O_u$, wherein $0.2 \leq x \leq 0.2$, $-0.2 \leq y \leq 0.2$, $-0.2 \leq z \leq 0.2$, $3.8 \leq u \leq 4.2$. The values of x, y, and z may vary depending on the ratio between the elements, but are all set within a range that allows the compound represented by the formula to exhibit a spinel structure.

In some embodiments, the spinel-structured lithium nickel manganese oxide is uniformly doped with elements favorable for phosphorus doping in its bulk phase, and thus the spinel-structured lithium nickel manganese oxide may have the chemical formula of $Li_{1+x}Ni_{0.5-y}Mn_{1.5-z}M_sO_u$, where M is at least one of Mg. Zn, Ni, Mn, Fe, Co, Ti, Cr, Y, Sc, Ru, Cu, Mo, Ge, W, Zr, Ca, Ta, Sr, Al, Nb, B, Si, F and S, $-0.2 \leq x \leq 0.2$, $-0.2 \leq y \leq 0.2$, $-0.2 \leq z \leq 0.2$, $0 < s \leq 0.2$ and $3.8 \leq u \leq 4.2$. The values of x, y, z, s, and u may vary depending on the ratio between the elements, but are all set within a range such that the compound represented by the chemical formula can exhibit a spinel structure.

In some embodiments, the site occupying element is Al, and the Al element is more conducive to improving structural stability of the positive electrode active material and reducing potential barrier of phosphorus element doping into the spinel structure.

In some embodiments, the inner core of the spinel phase has a size that may be any value between 0.1 μm and 30 μm, for example, 0.5 μm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm or 29 μm.

In some embodiments, the outer shell of the rocksalt-like structure phase has a thickness that may be any value between 0.5 nm and 50 nm, for example, 0.5 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm or 50 nm.

The lithium nickel manganese oxide modified material provided by the present application is doped with a phosphorus element, which is different from a phosphate-coated positive electrode active material in the related art. The phosphate-coated positive electrode active material refers to a material formed by covering the surface of spinel positive electrode material with phosphate crystal or amorphous phosphate, and the phosphate coating layer can be seen on the surface of the material through transmission electron microscopy. On the contrary, in the modified positive electrode active material provided by the present application, phosphorus element is doped in the primary particles. That is, the phosphorus element is doped into the spinel structure in a gradient concentration from the surface to the interior of the primary particle.

Both the spinel phase and the rocksalt-like structure phase of the primary particles may be doped with phosphorus element, but the rocksalt-like structure phase is preferably doped with the phosphorus element. The doping amount (concentration) of the phosphorus element in the primary particles gradually decreases from the outside to the inside. The surface gradient doping with phosphorus elements, that is the concentration of the doping elements decreases from the outside to the inside, can reduce the amount of dopants while ensuring that the material interface in contact with the electrolytic solution has a higher doping concentration and higher structural stability. The surface gradient doping can well relieve the structural stress generated in the de-intercalation process of lithium ions. Among high-valent elements, it was found by the inventors that the doping with phosphorus element can significantly improve the surface stability of materials and increase the interface stability. At the same time, the surface doping of phosphorus element combined with the oxide coating process can significantly improve the stability and electronic conductivity of materials.

The structure in which phosphorus element is distributed in the primary particles in a concentration gradient can be defined as a phosphorus gradient doping layer. In some embodiments, the phosphorus gradient doping layer has a thickness that can be any value between 0.5 nm and 40 nm and less than radius of the primary particle. For example, it can be 0.5 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm or 40 nm.

The positive electrode active material, the rocksalt-like structure surface layer and the phosphorus gradient doping layer provided in the present application can be characterized by common characterization methods in the art, such as scanning transmission electron microscopy (STEM), high-resolution TEM and X-ray photoelectron spectroscopy microscopy (XPS) for characterization. Among them, the distribution of the rocksalt-like structure phase as generated on the surface due to a part of site-occupying elements occupying 16c or 8a sites of a spinel octahedron can be accurately determined by STEM, the presence of a heterogeneous peak representing a rocksalt-like structure phase between 43° and 44° can be seen by XRD with a narrow range of fine scans and STEM line scan can also exhibit the gradient distribution of phosphorus element. At the same time, the etching analysis of X-ray photoelectron spectroscopy can be used to demonstrate the gradient distribution of phosphorus element in the phosphorus gradient doping layer. For the surface coating layer of inorganic compound, elements contained in the surface coating layer can be characterized by the following ways. For example, TEM may be used to probe the morphology, structure and composition of the surface coating layer to demonstrate its presence, and Raman and infrared spectroscopy can be used to characterize the chemical bonds of the surface coating materials to demonstrate the presence of the surface coating materials Through the above methods, but not limited to these methods, whether the positive electrode material is within the protection scope of this patent, can be determined.

In some embodiments, the inorganic compound may be any one or more selected from oxides, fluorides, phosphides, and borides. In some embodiments, the inorganic compound is selected from oxides. The oxide structure matches better with surface lattice of the rocksalt structure phase structure, which is conducive to the combination of the coating layer with the surface of the lithium nickel manganese oxide modified material, and which is conducive to reducing the loss of the coating layer under high voltage and improving the surface stability of positive electrode active materials.

In some embodiments, the inorganic compound may include an oxide, fluoride, phosphide or boride of any one element of Li, Mg, Zn, Ni, Mn, Fe, Co, Ti, Y, Sc, Ru, Cu, Mo, Gc, W, Zr, Ca, Ta, Al, Nb, B, Si, F, S, P and Sr. In some embodiments, the inorganic compound is an oxide, fluoride, phosphide or boride of a metal element of the above elements.

In some embodiments, the coating layer has a thickness of from 2 nm to 20 nm. At this thickness, the positive electrode active material combines high activity and high stability.

According to embodiments of the present application, a method for preparing the positive electrode active material as described above is provided, comprising the steps of:
- a. providing the lithium nickel manganese oxide modified material;
- b. mixing an inorganic compound or an inorganic compound precursor with the lithium nickel manganese modified material to obtain a coating mixture, in which the inorganic compound precursor will form the inorganic compound when sintered; and
- c. sintering the coating mixture at a temperature of from 150° C. to 550° C. for 0.5 hour to 20 hours.

In some embodiments, the step of providing the lithium nickel manganese modified material comprises:
- a1. mixing a phosphorus source, a rocksalt-like structure phase inducer, and a spinel-structured lithium nickel manganese oxide to obtain a doping mixture; and
- a2. sintering the doping mixture at a temperature of from 600° C. to 1200° C. for 0.5 hours to 20 hours.

The spinel-structured lithium nickel manganese oxide can be prepared by methods known to those skilled in the art. For example, it can be prepared by a low temperature solid phase method. Specifically, a nickel salt, a manganese salt, lithium hydroxide and oxalic acid may be mixed by ball milling to prepare a precursor, and then the precursor is calcined at high temperature to obtain the spinel-structured lithium nickel manganese oxide.

The phosphorus source may be one or more selected from nickel phosphate, cobalt phosphate, manganese phosphate, magnesium phosphate, calcium phosphate, iron phosphate, copper phosphate, zinc phosphate, titanium phosphate, zirconium phosphate, lithium phosphate, cobalt pyrophosphate, nickel pyrophosphate, manganese pyrophosphate, magnesium pyrophosphate, calcium pyrophosphate, iron pyrophosphate, copper pyrophosphate, zinc pyrophosphate, titanium pyrophosphate, zirconium pyrophosphate, ammonium phosphate, ammonium dihydrogen phosphate, diammonium hydrogen phosphate, lithium dihydrogen phosphate, dilithium hydrogen phosphate, lithium pyrophosphate, pyrophosphoric acid, phosphoric acid and phosphorus pentoxide.

In some embodiments, the rocksalt-like structure phase inducer may include one or more of oxides and salts of the site occupying element above, for example, one or more of $MgO$, $ZnO$, $Fe_2O_3$, $CoO$, $TiO$, $Cr_2O_3$, $Y_2O_3$, $Sc_2O_3$, $RuO_2$, $CuO$, $MoO_3$, $GeO_2$, $WO_3$, $ZrO_2$, $CaO$, $Ta_2O_5$. $Al_2O_3$, $Nb_2O$, $Nb_2O_5$, $B_2O_3$, $SiO_2$, $Al(OH)_3$, $H_3BO_3$, $NaAlO_2$, $Na_2SiO_3$.

In other embodiments, the rocksalt-like structure phase inducer may include one or more of organic acids or inorganic acids, such as hydrochloric acid, nitric acid, sulfuric acid, phosphoric acid, acetic acid, formic acid, oxalic acid, citric acid, and the like. The organic or inorganic acid may promote generation of a rocksalt-like structure phase.

The rocksalt-like structure phase inducer may be one or more of organic acids or inorganic acids alone, or may further include one or more of oxides and salts of site occupying elements. In some embodiments, the rocksalt-like structure phase inducer may also be one or more of oxides and salts of site occupying elements alone.

Specifically, in the case that the site occupying element is other elements than Ni and Mn, such as one or more of Mg, Zn, Fe, Co, Ti, Cr, Y, Sc, Ru, Cu, Mo, Ge, W, Zr, Ca, Ta, Sr, Al, Nb, B, Si, F and S, the rocksalt structure phase inducer is one or more of oxides and salts of Mg, Zn, Fe, Co, Ti, Cr, Y, Sc, Ru, Cu, Mo, Ge, W, Zr, Ca, Ta, Sr, Al, Nb, B, Si, F and S, or further comprises organic or inorganic acids. In the case that the site occupying element is composed of Ni and Mn, the rocksalt structure phase inducer can be a metal-free acidic compound, or one or more of oxides or salts of Ni and Mn, or one or more of oxides or salts of Ni and Mn and one or more of organic and inorganic acids.

The phosphorus source, the rocksalt-like structure phase inducer and the spinel-structured lithium nickel manganese oxide have a mass ratio that may be any ratio between 1:1:(20-400), for example, 1:1:50, 1:1:80, 1:1:100, 1:1:150, 1:1:200, 1:1:250, 1:1:300 or 1:1:350.

In step a1, the phosphorus source, the rocksalt-like structure phase inducer, and the spinel-structured lithium nickel manganese oxide can be mixed by methods known to those skilled in the art, such as mechanical mixing, ultrasound, ball milling, and the like.

In some embodiments, the doping mixture is sintered in step a2 by a procedure comprising heating it to 600° C.-1200° C. at a heating rate of 0.5° C./min-10° C./min, then sintering it for 0.5-20 hours, and then lowering it at a cooling rate of 0.5° C./min-10° C./min to room temperature. The specific sintering temperature may be 600° C. 650° C. 700° C., 800° C., 900° C., 1000° C. 1100° C. or 1200° C.

The sintering in step a2 can be performed at an atmosphere of oxygen, air, an atmosphere containing a reducing gas (such as hydrogen), or an inert atmosphere (such as nitrogen or argon) containing oxygen.

In some embodiments, the inorganic compound precursor is any one or more selected from oxides, organic compounds, fluorides, phosphides, and borides. Organic compounds are sintered to form oxides. For example, the organic compounds is any one or more selected from tetrabutyl titanate, polyvinylidene fluoride, tantalum ethoxide, niobium ethoxide, and phosphate.

In some embodiments, a mass ratio of the sum of the mass of the inorganic compound and its precursor to the lithium nickel manganese oxide modified material is (0.5-20):1000.

In step c, the specific sintering temperature may be 250° C., 300° C., 350° C., 400° C., 450° C., 500° C. or 550° C. The non-oxidizing atmosphere may be nitrogen or argon, for example.

The present application further provides a positive electrode for lithium ion secondary batteries, comprising a positive electrode current collector and a positive electrode active material layer on the positive electrode current collector, wherein the positive electrode active material layer includes the above-mentioned positive electrode active material.

The positive electrode current collector may be a conductive member formed of highly conductive metals used in a positive electrode for the related lithium ion secondary batteries. For example, the positive electrode current collector may be aluminum or an alloy including aluminum as a main component. The shape of the positive electrode current collector is not particularly limited because it may vary depending on the shape and the like of lithium ion secondary batteries. For example, the positive electrode current collector may have various shapes such as a rod shape, a plate shape, a sheet shape, and a foil shape.

The positive electrode active material layer further includes a conductive additive and a binder.

The conductive additive may be a conventional conductive additive in the art, which is not particularly limited in the present application. For example, in some embodiments, the conductive additive is carbon black (e.g., acetylene black or Ketjen black).

The binder may be a conventional binder in the art, which is not particularly limited in the present application, and may be composed of polyvinylidene fluoride (PVDF), or may be composed of carboxymethyl cellulose (CMC) and styrene-butadiene rubber (SBR). In some embodiments, the binder is polyvinylidene fluoride (PVDF).

The present application further provides a lithium-ion secondary battery, comprising: the above-mentioned positive electrode; a negative electrode comprising a negative electrode current collector and a negative electrode active material layer on the negative electrode current collector; a separator and an electrolytic solution.

The negative electrode, separator and electrolyte can adopt conventional negative electrode current collector, separator and electrolyte materials in the art, which are not particularly limited in the present application.

The negative electrode current collector may be copper, and the shape of the negative electrode current collector is also not particularly limited, and may be rod-shaped, plate-shaped, sheet-shaped, and foil-shaped, and may vary depending on the shape and the like of lithium ion secondary batteries. The negative electrode active material layer includes a negative electrode active material, a conductive additive and a binder. The negative active material, conductive additive and binder are also conventional materials in the art. In some embodiments, the negative active material is metal lithium. The conductive additive and binder are as described above and will not be repeated here.

The separator can adopt those separators commonly used in lithium ion secondary batteries, such as polyolefin films, microporous films made of polyethylene or polypropylene; porous polyethylene films and polypropylene multilayer films; non-woven fabrics formed of polyester fibers, aramid fibers, and glass fibers; and substrate films formed by adhering ceramic particles such as silica, alumina, and titania to the surface of the above-mentioned films. In some embodiments, the separator is a triple layer film of PP/PE/PP coated on both sides with alumina.

The electrolytic solution may include an electrolyte and a non-aqueous organic solvent. The electrolyte is selected from but not limited to $LiPF_6$, $LiBF_4$, $LiSbF_6$ and $LiAsF_6$. The non-aqueous organic solvent can be carbonates, esters and ethers. Among them, carbonates such as ethylene carbonate (EC), diethyl carbonate (DEC), dimethyl carbonate (DMC) and ethylmethyl carbonate (EMC) can be used. In some embodiments, the electrolytic solution is a non-aqueous electrolytic solution of $LiPF_6$ with a concentration of 1 mol/L in ethylene carbonate (EC)/dimethyl carbonate (DMC), wherein EC to DMC has a volume ratio of 1:1.

The following are specific examples, which are intended to further describe the application in detail to help those skilled in the art and researchers to further understand the application, and the relevant technical conditions and the like do not constitute any limitation to the application. Any modifications made within the scope of the claims of the present application are all within the protection scope of the claims of the present application.

In the following examples, STEM was performed with a spherical aberration-corrected scanning transmission microscope model JEM ARM200F (JEOL, Tokyo, Japan); X-ray photoelectron spectroscopy (XPS) was performed with an ESCALAB250 X-ray photoelectron spectrometer produced by Thermo Fisher Company to study the types of elements and chemical environment on the surface of powder samples, in which the X-ray radiation source is Mg Kα.

Example 1

18 g of $LiNi_{0.5}Mn_{1.5}O_4$ material (available from Shandong Qixing Energy Materials Co., Ltd.), 0.54 g of CuO and 0.267 g of $(NH_4)_2HPO_4$ were uniformly mixed, and the resulting mixture was calcined in oxygen at 600° C. for 5 h with at a heating rate of 3° C./min, and a cooling rate of 5° C./min, thereby obtaining a lithium nickel manganese oxide modified material with a gradient doping of phosphorus element. 10 g of the modified material, 0.05 g of boron oxide and 0.1 g of alumina were taken to carry out solid-phase mixing uniformly, and then the resulting mixture was sintered at 450° C. for 10 h in air, thereby finally obtaining lithium nickel manganese oxide positive electrode active material with a surface gradient doping of phosphorus element that is co-coated with boron oxide-alumina.

FIG. 1 is an STEM image of the phosphorus element gradient-doped lithium nickel manganese oxide modified material prepared in Example 1. It can be seen from FIG. 1 that a rocksalt-like structure phase that is generated by the occupancy of 16c position of spinel octahedron is present on the surface of the material, and the rocksalt-like structure phase has a thickness of about 12 nm.

Figure 2A:
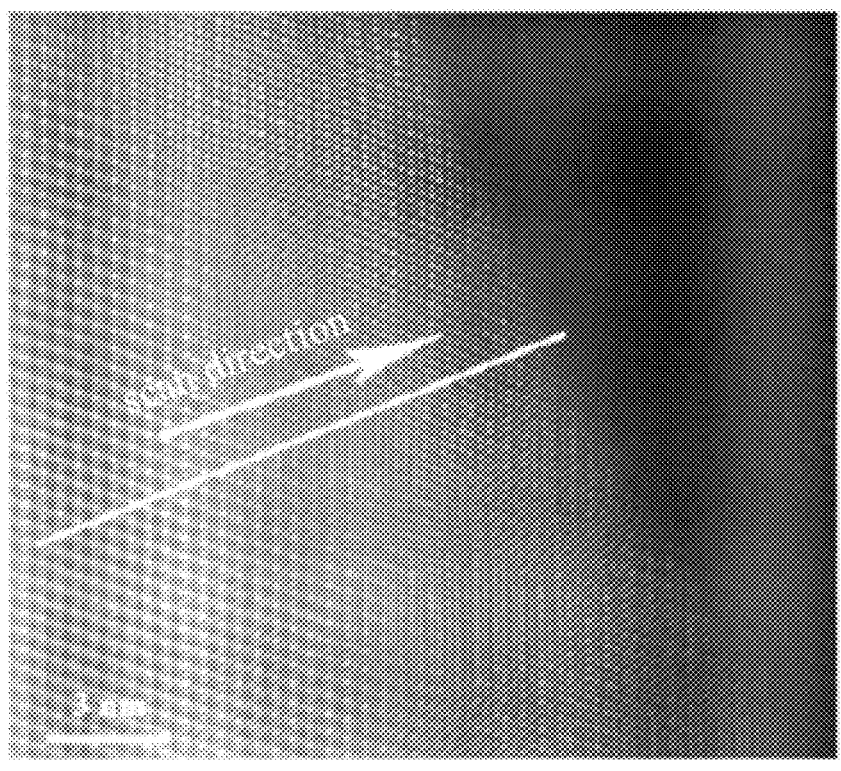
FIG. 2A and FIG. 2B are STEM line scan images of phosphorus element on the surface of the phosphorus-doped lithium nickel manganese oxide modified material prepared in Example 1 of the present application.
Figure 2B:
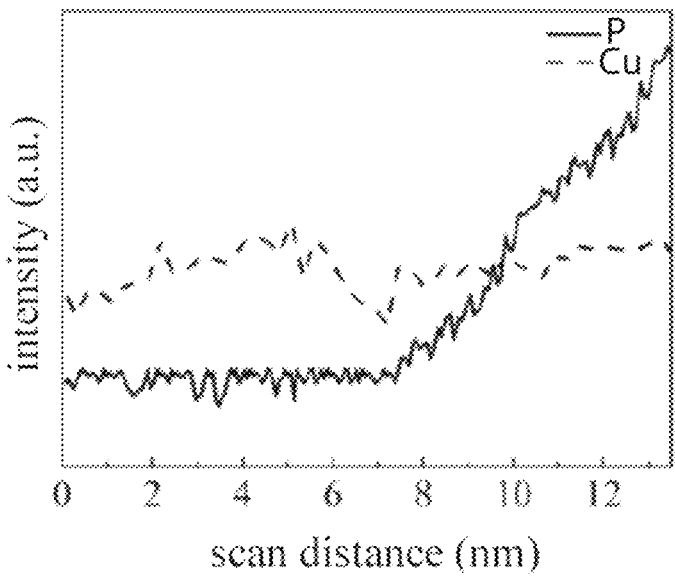

FIG. 2A and FIG. 2B are STEM line scan images of phosphorus element content on the surface of the phosphorus element gradient-doped lithium nickel manganese oxide modified material prepared in Example 1 of the present application. It can be seen from FIG. 2A and FIG. 2B that there is no coating layer on the surface of doped lithium nickel manganese oxide and in combination with FIG. 1 that phosphorus element is distributed in the rocksalt-like structure phase, and the content of phosphorus element gradually decreases from the surface to the interior.

Figure 3:
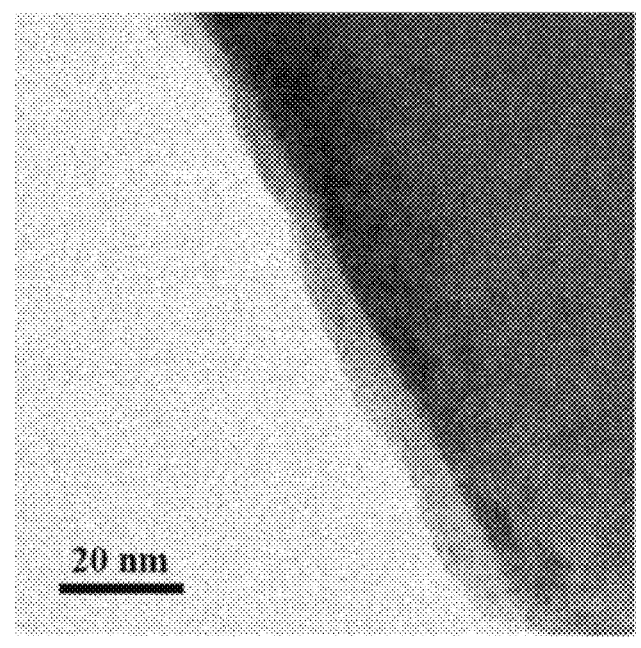
FIG. 3 is a transmission electron microscope (TEM) image of the coated lithium nickel manganese oxide positive electrode active material prepared in Example 1 of the present application.

FIG. 3 is a transmission electron microscope (TEM) image of the coated lithium nickel manganese oxide positive electrode active material prepared in Example 1 of the present application. It can be seen that a coating layer is formed on the surface of the lithium nickel manganese oxide modified material, and the coating layer has a thickness of about 6-8 nm.

Example 2

18 g of $LiNi_{0.4}Mn_{1.6}O_4$ material (available from Shandong Qixing Energy Materials Co., Ltd.), 0.54 g of $H_3PO_4$ and 1 g of oxalic acid were uniformly mixed, and the resulting mixture was calcined in oxygen at 600° C. for 5 h with at a heating rate of 3° C./min, and a cooling rate of 5° C./min, thereby obtaining a phosphorus-gradient-doped lithium nickel manganese oxide modified material. 10 g of the modified material, and 0.1 g of polyvinylidene fluoride were taken to carry out solid-phase mixing uniformly, and then the resulting mixture was sintered at 250° C. for 15 h in vacuum, thereby finally obtaining a fluoride-coated and surface-phosphorus-gradient-doped lithium nickel manganese oxide positive electrode active material.

Figure 4A:
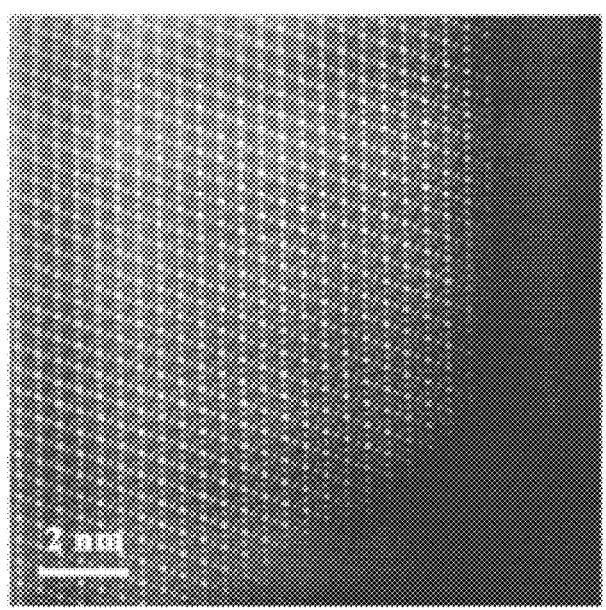
FIGS. 4A and 4B are STEM images of the phosphorus-doped lithium nickel manganese oxide modified material prepared in Example 2 of the present application.
Figure 4B:
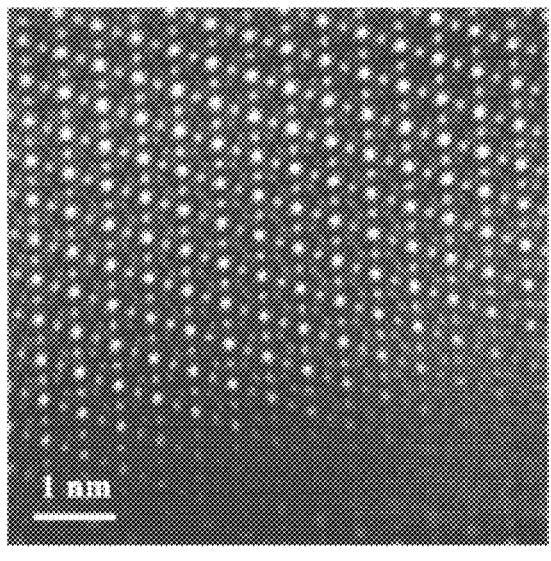

FIG. 4A and FIG. 4B are STEM images of the phosphorus element gradient-doped lithium nickel manganese oxide modified material prepared in Example 2, in which FIG. 4A and FIG. 4B. are images at different magnifications. It can be seen from FIG. 4A and FIG. 4B that a rocksalt-like structure phase that is generated by the occupancy of 8a position of spinel octahedron is present on the surface of the material, and the rocksalt-like structure phase has a thickness of about 10 nm.

Figure 5:
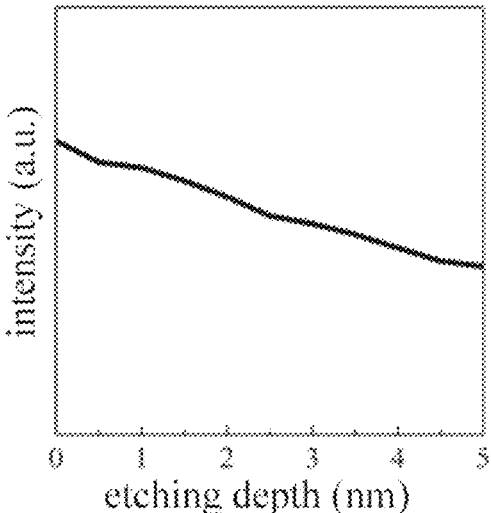
FIG. 5 shows the relative content of phosphorus elements on the surface of the phosphorus-doped lithium nickel manganese oxide modified material prepared in Example 2 of the present application at different etching depths, characterized by X-ray photoelectron spectroscopy (XPS).

FIG. 5 shows the relative content of phosphorus elements on the surface of the phosphorus-doped lithium nickel manganese oxide modified material prepared in Example 2 of the present application at different etching depths, charterized by XPS. We can see that the content of phosphorus element decreases from the surface to the interior with increasing etching depth.

Figure 6:
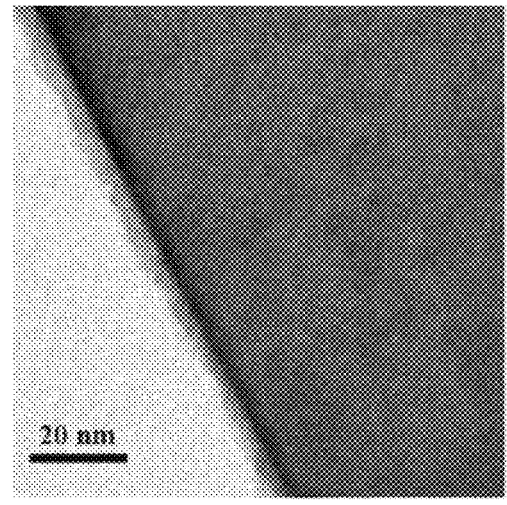
FIG. 6 is a TEM image of the coated lithium nickel manganese oxide positive electrode active material prepared in Example 2 of the present application.

FIG. 6 is a transmission electron microscope (TEM) image of the coated lithium nickel manganese oxide positive electrode active material prepared in Example 2 of the present application. It can be seen that a coating layer is formed on the surface of the lithium nickel manganese oxide modified material, and the coating layer has a thickness of about 2-3 nm.

Example 3

180 g of $LiNi_{0.5}Mn_{1.5}O_4$ material (available from Shandong Qixing Energy Materials Co., Ltd.), 5.4 g of $Cr_2O_3$ and 2.67 g of $(NH_4)_2HPO_4$ and 20 ml of deionized water were charged into a beaker to mix uniformly, and the beaker was placed in an oil bath at 120° C. and the content was heated for 5 h with stirring to obtain a dry mixture. The obtained mixture was calcined in air at 725° C. for 5 h, with a heating rate of 3° C./min and a cooling rate of 5° C./min to obtain a phosphorus-element-gradient-doped lithium nickel manganese oxide modified material. 100 g of the modified material and 0.2 g of nano-tungsten oxide were taken to carry out solid-phase mixing uniformly, and then the resulting mixture was sintered at 550° C. for 1 h in air, thereby finally obtaining a tungsten oxide-coated and surface-phosphorus-gradient-doped lithium nickel manganese oxide cathode active material.

Comparative Example 1

Comparative Example 1 was basically the same as example 1 with the exception that no phosphorus is doped in the lithium nickel manganese oxide modified material. That is, no phosphorus source $(NH_4)_2HPO_4$ is added during the preparation process and the non-surface-phosphorus-gradient-doped lithium nickel manganese oxide is directly coated.

Comparative Example 2

Comparative Example 2 was basically the same as example 1 with the exception that the lithium nickel manganese oxide modified material is not further coated with boron oxide and aluminum oxide.

Comparative Example 3

Comparative Example 2 was basically the same as example 1 with the exception that no phosphorus is doped in the lithium nickel manganese oxide modified material, and the lithium nickel manganese oxide modified material is not further coated with boron oxide and aluminum oxide.

Comparative Example 4

Comparative Example 4 was basically the same as example 2 with the exception that no phosphorus is doped in the lithium nickel manganese oxide modified material. That is, no phosphorus source $H_3PO_4$ is added during the preparation process.

Comparative Example 5

Comparative Example 5 was basically the same as example 2 with the exception that the lithium nickel manganese oxide modified material is not further coated with fluoride.

The positive electrode active materials prepared in Examples 1 to 3 and Comparative Examples 1 to 6 were assembled into button cells according to the following steps.

(1) Preparation of Positive Electrode Plate

The positive active materials prepared in the examples and comparative examples, carbon black as a conductive additive and polyvinylidene fluoride (PVDF) as a binder, were dispersed in N-methylpyrrolidone (NMP) in a weight ratio of 80:10:10 and the mixture was mixed uniformly to prepare a uniform positive electrode slurry. The uniform positive electrode slurry was evenly coated on a aluminum foil current collector with a thickness of 15 μm, and dried at 55° C. to form an electrode plate with a thickness of 100 μm. The electrode plate was placed under a roller press for rolling with a pressure of about 1 MPa×1.5 cm$^2$, cut into a circle with a diameter of φ14 mm, and then placed in a vacuum oven to bake at 120° C. for 6 hours. After natural cooling, it was taken out and placed in a glove box for use as a positive electrode plate.

(2) Assembly of Lithium-Ion Secondary Batteries

In a glove box filled with an inert atmosphere, the positive electrode prepared in step (1) was used as a positive electrode, metal lithium was used as a negative electrode for batteries, and a triple-layer film of PP/PE/PP coated with alumina on both sides was placed between the positive electrode and the negative electrode as a separator, in which cycle test using a blue battery charge and discharge tester. First, the test was carried out at room temperature (25° C.) at a rate of 0.1 C for 1 cycle, and then at a rate of 0.2 C for 200 cycles, wherein the charge-discharge voltage of batteries was controlled in the range of 3.5V-4.9V.

The experimental data are listed in Table 1 and Table 2.

TABLE 1

Electrochemical properties of the positive active
materials of each examples of the present application

| Samples | Example 1 | Example 2 | Example 3 |
|---|---|---|---|
| Test temperature ° C. | 55 | 55 | 55 |
| Initial reversible capacity mAh/g | 132.2 | 131.5 | 133.5 |
| Reversible capacity mAh/g after 50 cycles | 129 | 129.5 | 130.2 |
| Coulomb efficiency % after 50 cycles | 99.05 | 99.15 | 99.21 |
| Resistivity (KΩ/cm) | 550 | 515 | 539 |

TABLE 2

Electrochemical performance of the positive electrode active materials of each
comparative example of the present application

| Samples | Comparative Example 1 | Comparative Example 2 | Comparative Example 3 | Comparative Example 4 | Comparative Example 5 |
|---|---|---|---|---|---|
| Test temperature ° C. | 55 | 55 | 55 | 55 | 55 |
| Initial reversible capacity mAh/g | 131.2 | 131.5 | 133.6 | 127.2 | 129.3 |
| Reversible capacity mAh/g after 50 cycles | 120.5 | 128 | 111.9 | 125.4 | 124.9 |
| Coulomb efficiency % after 50 cycles | 98.62 | 98.87 | 98.24 | 98.83 | 98.39 |
| Resistivity (KΩ/cm) | 1025 | 500 | 784 | 756 | 635 | a conventional carbonate electrolytic solution was added dropwise, to assemble a button-type battery with a model of CR2032.

Cycle Tests (1) High Temperature Cycle:

The prepared button battery was allowed to stand at room temperature (25° C.) for 10 hours, the button battery was activated by charging and discharging, and then the button battery prepared above was subjected to a charge-discharge cycle test using a blue battery charge and discharge tester. First, the test was carried out at room temperature (25° C.) at a rate of 0.1 C for 1 cycle, and then at a rate of 0.2 C for 4 cycled, wherein the charge-discharge voltage of batteries was controlled in the range of 3.5V-4.9V. Then, the button battery was transferred to a high temperature environment of 55° C., and subjected to the test for 50 cycles at a rate of 0.2 C, while the charge-discharge voltage of batteries was controlled in the range of 3.5V-4.9V.

(2) Room Temperature Cycle:

The prepared button battery was allowed to stand at room temperature (25° C.) for 10 hours, the button battery was activated by charging and discharging, and then the button battery prepared above was subjected to a charge-discharge It is shown from the results that the capacity retention rate and cycle performance of batteries are greatly improved after surface phosphorus doping, compared with the lithium nickel manganese oxide active material without doping with phosphorus element. Through the phosphorus gradient doping, harmful side reactions between the positive active material and the electrolytic solution are suppressed, and the decomposition of the electrolytic solution and the dissolution of Mn/Ni are suppressed, thereby improving the cycle stability of batteries. In addition, the phosphorus doping can improve the coating effect, and further improve the surface stability and electronic conductivity of the surface-coated positive electrode active material.

Some exemplary embodiments of the present invention are provided as follows.

Embodiment 1. A positive electrode active material, characterized in that it comprises a lithium nickel manganese oxide modified material and a coating layer on the surface of the lithium nickel manganese oxide modified material;

the coating layer is composed of an inorganic compound, with the inorganic compound being any one or more selected from oxides, fluorides, phosphides, and borides;

the lithium nickel manganese oxide modified material is a primary particle with a core-shell-like structure comprising a spinel phase and a rocksalt-like structure phase, with the spinel phase being an inner core, and the rocksalt-like structure phase being distributed on the surface of the spinel phase to form an outer shell;

the spinel phase is a spinel-structured lithium nickel manganese oxide;

the rocksalt-like structure phase is formed by inducing the spinel-structured lithium nickel manganese oxide and the rocksalt-like structure phase contains at least one of Mg, Zn, Ni, Mn, Fe, Co, Ti, Cr, Y, Sc, Ru, Cu, Mo, Ge, W, Zr, Ca, Ta, Sr, Al, Nb, B, Si, F and S as a site occupying element, with the site occupying element occupying the 16c or 8a site of the spinel structure; and the rocksalt-like structure phase is further doped with a phosphorus element, with the phosphorus element being distributed in a gradient concentration from the outer surface to the interior of the rocksalt-like structure phase, forming a phosphorus gradient doping layer.

Embodiment 2. The positive electrode active material according to Embodiment 1, wherein the inorganic compound comprises any one or more of oxides, fluorides, phosphides and borides of any one element selected from Li, Mg, Zn, Ni, Mn, Fe, Co, Ti, Y, Sc, Ru, Cu, Mo, Ge, W, Zr, Ca, Ta, Al, Nb, B, Si, F, S, P and Sr.

Embodiment 3. The positive electrode active material according to any one of Embodiments 1 to 2, wherein the spinel-structured lithium nickel manganese oxide has the chemical formula of $Li_{1+x}Ni_{0.5-y}Mn_{1.5-z}M_sO_u$, in which M is at least one of Mg, Zn, Ni, Mn, Fe, Co, Ti, Cr, Y, Sc, Ru, Cu, Mo, Ge, W, Zr, Ca, Ta, Sr, Al, Nb, B, Si, F and S, $-0.2 \leq x \leq 0.2$, $-0.2 \leq y \leq 0.2$, $-0.2 \leq z \leq 0.2$, $0 < s \leq 0.2$ and $3.8 \leq u \leq 4.2$.

Embodiment 4. The positive electrode active material according to any one of Embodiments 1 to 3, wherein the coating layer has a thickness of from 2 nm to 20 nm.

Embodiment 5. The positive electrode active material according to any one of Embodiments 1 to 4, wherein the spinel phase has a size of 0.1 μm to 30 μm.

Embodiment 6. The positive electrode active material according to any one of Embodiments 1 to 5, wherein the rocksalt-like structure phase has a thickness of 0.5 nm to 50 nm.

Embodiment 7. The positive electrode active material according to any one of Embodiments 1 to 6, wherein the primary particle has a phosphorus element concentration that gradually decreases from the outer surface to the interior thereof.

Embodiment 8. The positive electrode active material according to any one of Embodiments 1 to 7, wherein the phosphorus gradient doping layer has a thickness of from 0.5 nm to 40 nm.

Embodiment 9. A method for preparing the positive electrode active material according to any one of Embodiments 1 to 8, comprising the steps of:

providing the lithium nickel manganese oxide modified material;

mixing the inorganic compound or an inorganic compound precursor with the lithium nickel manganese modified material to obtain a coating mixture, in which the inorganic compound precursor will form the inorganic compound when sintered; and sintering the coating mixture in air, oxygen or inert gas at a temperature of from 150° C. to 550° C. for 0.5 hour to 20 hours.

Embodiment 10. The method for preparing the positive electrode active material according to Embodiment 9, wherein the step of providing the lithium nickel manganese modified material comprises:

mixing a phosphorus source, a rocksalt-like structure phase inducer, and a spinel-structured lithium nickel manganese oxide to obtain a doping mixture; and sintering the doping mixture at a temperature of from 600° C. to 1200° C. for 0.5 hours to 20 hours.

Embodiment 11. The method for preparing the positive electrode active material according to any one of Embodiments 9 to 10, wherein the phosphorus source, the rocksalt-like structure phase inducer, and the spinel-structured lithium nickel manganese oxide have a mass ratio of 1:1:(20-400).

Embodiment 12. The method for preparing the positive electrode active material according to any one of Embodiments 9 to 11, wherein the rocksalt-like structure phase inducer is one or more of oxides and salts of the site occupying element.

Embodiment 13. The method for preparing the positive electrode active material according to any one of Embodiments 9 to 12, wherein the rocksalt-like structure phase inducer further comprises one or more of an organic acid or an inorganic acid.

Embodiment 14. The method for preparing the positive electrode active material according to any one of Embodiments 9 to 13, wherein the site occupying element is Ni, Mn or the combination thereof, and the rocksalt structure phase inducer consists of an organic acid, an inorganic acid or the combination thereof.

Embodiment 15. The method for preparing the positive electrode active material according to any one of Embodiments 9 to 14, wherein the rocksalt-like structure phase inducer comprises one or more of MgO, ZnO, $Fe_2O_3$, CoO, TiO, $Cr_2O_3$, $Y_2O_3$, $SC_2O_3$, $RuO_2$, CuO, $MoO_3$, $GeO_2$, $WO_3$, $ZrO_2$, CaO, $Ta_2O_5$, $Al_2O_3$, $Nb_2O$, $Nb_2O_5$, $B_2O_3$, $SiO_2$, $Al(OH)_3$, $H_3BO_3$, $NaAlO_2$, and $Na_2SiO_3$.

Embodiment 16. The method for preparing the positive electrode active material according to any one of Embodiments 9 to 15, wherein the doping mixture is sintered at a procedure comprising heating it to 600° C.-1200° C. at a heating rate of 0.5° C./min-10° C./min, then sintering it for 0.5-20 hours, and then lowering it at a cooling rate of 0.5° C./min-10° C./min to room temperature.

Embodiment 17. The method for preparing the positive electrode active material according to any one of Embodiments 9 to 16, wherein the inorganic compound precursor is any one or more selected from oxides, organic compounds, fluorides, phosphides, and borides.

Embodiment 18. A positive electrode for a lithium ion secondary battery, comprising a positive electrode current collector and a positive electrode active material film on the positive electrode current collector, wherein the positive electrode active material film comprises the positive electrode active material according to any one of Embodiments 1 to 8.

Embodiment 19. A lithium-ion secondary battery, comprising: the positive electrode according to Embodiment 18;

a negative electrode comprising a negative electrode current collector and a negative electrode active material film on the negative electrode current collector;

a separator and an electrolyte.

The technical features of the above-described embodiments can be combined arbitrarily. For the sake of brevity, all possible combinations of the technical features in the above-described embodiments are not described. All combination of these features should be considered as the scope of this specification, as long as they do not contradict each other.

The above-mentioned examples only represent several embodiments of the present application, and the descriptions thereof are relatively specific and detailed, but should not be construed as a limitation on the scope of the patent application. It should be noted that, for those of ordinary skill in the art, without departing from the concept of the present application, several modifications and improvements can be made, which all belong to the protection scope of the present application. Therefore, the scope of protection of the patent of the present application shall be subject to the appended claims.

What is claimed is:

1. A positive electrode active material, comprising a lithium nickel manganese oxide modified material and a coating layer on the surface of the lithium nickel manganese oxide modified material;

the coating layer is composed of an inorganic compound, with the inorganic compound being any one or more selected from oxides, fluorides, phosphides, and borides;

the lithium nickel manganese oxide modified material is a primary particle with a core-shell-like structure comprising a spinel phase and a rocksalt-like structure phase, with the spinel phase being an inner core, and the rocksalt-like structure phase being distributed on the surface of the spinel phase to form an outer shell;

the spinel phase is a spinel-structured lithium nickel manganese oxide;

the rocksalt-like structure phase is formed by inducing the spinel-structured lithium nickel manganese oxide and the rocksalt-like structure phase contains at least one of Mg, Zn, Ni, Mn, Fe, Co, Ti, Cr, Y, Sc, Ru, Cu, Mo, Ge, W, Zr, Ca, Ta, Sr, Al, Nb, B, Si, F and S as a site occupying element, with the site occupying element occupying the 16c or 8a site of the spinel structure; and the rocksalt-like structure phase is further doped with a phosphorus element, with the phosphorus element being distributed in a gradient concentration from the outer surface to the interior of the rocksalt-like structure phase, forming a phosphorus gradient doping layer.

2. The positive electrode active material according to claim 1, wherein the inorganic compound comprises any one or more of oxides, fluorides, phosphides and borides of any one element selected from Li, Mg, Zn, Ni, Mn, Fe, Co, Ti, Y, Sc, Ru, Cu, Mo, Ge, W, Zr, Ca, Ta, Al, Nb, B, Si, F, S, P and Sr.

3. The positive electrode active material according to claim 1, wherein the spinel-structured lithium nickel manganese oxide has the chemical formula of $Li_{1+x}Ni_{0.5-y}Mn_{1.5-z}M_sO_u$, in which M is at least one of Mg, Zn, Ni, Mn, Fe, Co, Ti, Cr, Y, Sc, Ru, Cu, Mo, Ge, W, Zr, Ca, Ta, Sr, Al, Nb, B, Si, F and S, $-0.2 \leq x \leq 0.2$, $-0.2 \leq y \leq 0.2$, $-0.2 \leq z \leq 0.2$, $0 < s \leq 0.2$ and $3.8 \leq u \leq 4.2$.

4. The positive electrode active material according to claim 1, wherein the coating layer has a thickness of from 2 nm to 20 nm.

5. The positive electrode active material according to claim 1, wherein the spinel phase has a size of 0.1 μm to 30 μm.

6. The positive electrode active material according to claim 1, wherein the rocksalt-like structure phase has a thickness of 0.5 nm to 50 nm.

7. The positive electrode active material according to claim 1, wherein the primary particle has a phosphorus element concentration that gradually decreases from the outer surface to the interior thereof.

8. The positive electrode active material according to claim 1, wherein the phosphorus gradient doping layer has a thickness of from 0.5 nm to 40 nm.

9. A positive electrode for a lithium ion secondary battery, comprising a positive electrode current collector and a positive electrode active material film on the positive electrode current collector, wherein the positive electrode active material film comprises the positive electrode active material according to claim 1.

10. A lithium-ion secondary battery, comprising:

the positive electrode according to claim 9;

a negative electrode comprising a negative electrode current collector and a negative electrode active material film on the negative electrode current collector;

a separator and an electrolyte.

11. A method for preparing the positive electrode active material according to claim 1, comprising the steps of:

providing the lithium nickel manganese oxide modified material;

mixing the inorganic compound or an inorganic compound precursor with the lithium nickel manganese modified material to obtain a coating mixture, in which the inorganic compound precursor will form the inorganic compound when sintered; and sintering the coating mixture in air, oxygen or inert gas at a temperature of from 150° C. to 550° C. for 0.5 hour to 20 hours.

12. The method for preparing the positive electrode active material according to claim 11, wherein the step of providing the lithium nickel manganese modified material comprises:

mixing a phosphorus source, a rocksalt-like structure phase inducer, and a spinel-structured lithium nickel manganese oxide to obtain a doping mixture; and sintering the doping mixture at a temperature of from 600° C. to 1200° C. for 0.5 hours to 20 hours.

13. The method for preparing the positive electrode active material according to claim 12, wherein the phosphorus source, the rocksalt-like structure phase inducer, and the spinel-structured lithium nickel manganese oxide have a mass ratio of 1:1:(20-400).

14. The method for preparing the positive electrode active material according to claim 12, wherein the rocksalt-like structure phase inducer is one or more of oxides and salts of the site occupying element.

15. The method for preparing the positive electrode active material according to claim 14, wherein the rocksalt-like structure phase inducer further comprises one or more of an organic acid or an inorganic acid.

16. The method for preparing the positive electrode active material according to claim 12, wherein the site occupying element is Ni, Mn or the combination thereof, and the rocksalt structure phase inducer consists of an organic acid, an inorganic acid or the combination thereof.

17. The method for preparing the positive electrode active material according to claim 12, wherein the rocksalt-like structure phase inducer comprises one or more of MgO, ZnO, $Fe_2O_3$, CoO, TiO, $Cr_2O_3$, $Y_2O_3$, $SC_2O_3$, $RuO_2$, CuO, $MoO_3$, $GeO_2$, $WO_3$, $ZrO_2$, CaO, $Ta_2O_5$, $Al_2O_3$, $Nb_2O$, $Nb_2O_5$, $B_2O_3$, $SiO_2$, $Al(OH)_3$, $H_3BO_3$, $NaAlO_2$, and $Na_2SiO_3$.

18. The method for preparing the positive electrode active material according to claim 12, wherein the doping mixture is sintered at a procedure comprising heating it to 600° C.-1200° C. at a heating rate of 0.5° C./min-10° C./min, then sintering it for 0.5-20 hours, and then lowering it at a cooling rate of 0.5° C./min-10° C./min to room temperature.

19. The method for preparing the positive electrode active material according to claim 11, wherein the inorganic compound precursor is any one or more selected from oxides, organic compounds, fluorides, phosphides, and borides.

* * * * *